(12) United States Patent
Katano et al.

(10) Patent No.: US 9,805,876 B2
(45) Date of Patent: Oct. 31, 2017

(54) METHOD FOR MANUFACTURING ELECTRODE FOR ALUMINUM ELECTROLYTIC CAPACITOR

(71) Applicants: NIPPON LIGHT METAL COMPANY, LTD., Shinagawa-ku (JP); TOYO ALUMINIUM KABUSHIKI KAISHA, Osaka-shi (JP)

(72) Inventors: Masahiko Katano, Shizuoka (JP); Yuya Yoshida, Shizuoka (JP); Yoshihiro Taguchi, Shizuoka (JP); Asami Shirai, Shizuoka (JP); Yuta Shimizu, Shizuoka (JP); Toshifumi Taira, Osaka (JP); Masashi Mehata, Osaka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/421,748

(22) PCT Filed: Jul. 23, 2013

(86) PCT No.: PCT/JP2013/069950
§ 371 (c)(1),
(2) Date: Feb. 13, 2015

(87) PCT Pub. No.: WO2014/041898
PCT Pub. Date: Mar. 20, 2014

(65) Prior Publication Data
US 2015/0221443 A1    Aug. 6, 2015

(30) Foreign Application Priority Data
Sep. 13, 2012  (JP) ................. 2012-201991

(51) Int. Cl.
*B05D 5/12* (2006.01)
*H01G 9/045* (2006.01)
(Continued)

(52) U.S. Cl.
CPC ............... *H01G 9/045* (2013.01); *B05D 1/18* (2013.01); *B05D 3/0254* (2013.01); *B05D 5/00* (2013.01);
(Continued)

(58) Field of Classification Search
USPC ...................... 427/79–81; 29/25.41
See application file for complete search history.

(56) References Cited

U.S. PATENT DOCUMENTS 5,078,845 A * 1/1992 Kunugihara ........... C25D 11/12
                                                                 205/153
6,096,184 A    8/2000 Yoshida et al.
(Continued)

FOREIGN PATENT DOCUMENTS

JP    02-128415 A    5/1990
JP    08-064480 A    3/1996
(Continued)

OTHER PUBLICATIONS

International Search Report (PCT/ISA/210) mailed on Aug. 20, 2013, by the Japanese Patent Office as the International Searching Authority for International Application No. PCT/JP2013/069950.

*Primary Examiner* — Brian K Talbot
(74) *Attorney, Agent, or Firm* — Buchanan Ingersoll & Rooney PC

(57) ABSTRACT

A porous aluminum electrode has a porous layer formed by sintering aluminum powder on the surface of an aluminum core. The porous aluminum electrode, when subjected to a formation to a voltage of 200V or more, is boiled and then subjected to a first forming process in which formation is
(Continued)

performed in an aqueous solution of ammonium adipate at a temperature of 80° C. or below and a second forming process in which formation is performed in a boric acid aqueous solution. When heat depolarization is first carried out, washing with water is performed for five minutes or more before heat depolarization; therefore, the porous layer is not destroyed.

11 Claims, 3 Drawing Sheets

(51) Int. Cl.
*H01G 9/052* (2006.01)
*B05D 1/18* (2006.01)
*B05D 3/02* (2006.01)
*B05D 5/00* (2006.01)
*H01G 9/00* (2006.01)
*H01G 9/04* (2006.01)

(52) U.S. Cl.
CPC .......... *H01G 9/0029* (2013.01); *H01G 9/052* (2013.01); *H01G 9/0525* (2013.01); *H01G 2009/0408* (2013.01)

(56) References Cited

U.S. PATENT DOCUMENTS

| | | | |
|---|---|---|---|
| 6,243,256 B1* | 6/2001 | Furuta | H01G 9/045 29/25.03 |
| 7,175,676 B1* | 2/2007 | Stevens | H01G 9/0032 29/25.01 |
| 2007/0183120 A1* | 8/2007 | Fujimoto | H01G 9/0032 361/528 |
| 2008/0043403 A1 | 2/2008 | Ueda et al. | |
| 2011/0053764 A1 | 3/2011 | Taira et al. | |

FOREIGN PATENT DOCUMENTS

| | | |
|---|---|---|
| JP | 08-296088 A | 11/1996 |
| JP | 09-246111 A | 9/1997 |
| JP | 11-045827 A | 2/1999 |
| JP | 11-045828 A | 2/1999 |
| JP | 2007-189038 A | 7/2007 |
| JP | 2007-234768 A | 9/2007 |
| JP | 2011-052291 A | 3/2011 |

* cited by examiner 10, 30

METHOD FOR MANUFACTURING ELECTRODE FOR ALUMINUM ELECTROLYTIC CAPACITOR

TECHNICAL FIELD

The present invention relates to a method for manufacturing an electrode for an aluminum electrolytic capacitor in which an aluminum electrode is chemically formed in an aqueous solution of ammonium adipate.

BACKGROUND ART

When manufacturing an aluminum electrolytic capacitor, an oxide film (dielectric film) is conventionally formed by chemically treating the surface of aluminum foil, the effective surface area of which has been increased via etching, thereby creating an anode. To form an oxide film having a withstand voltage of 200 V or higher for an anode used in such an aluminum electrolytic capacitor, the aluminum foil is boiled in purified water, then subjected to an aqueous borate or phosphate solution, and a thermal depolarization process of heating the aluminum foil is performed during the formation. It has also been proposed, when manufacturing an anode having a film withstand voltage of 200 V or higher, to perform the formation upon the aluminum foil using an aqueous solution of ammonium adipate, as in the case of low-voltage anodes, in order to improve capacitance (patent documents 1, 2).

Meanwhile, the use of a porous aluminum electrode constituted by an aluminum core and a porous layer formed by sintering powdered aluminum layered upon a surface thereof instead of an etched aluminum foil as an anode for an aluminum electrolytic capacitor has also been proposed. Such a porous aluminum electrode has the advantage of eliminating the need to perform etching using hydrochloric acid or the like (patent document 3). A porous aluminum electrode also has the advantages of allowing for the formation of a porous layer of sufficient thickness and creating a structure of intricately intertwined spaces, thereby allowing for increased capacitance.

PRIOR ART DOCUMENTS

Patent Documents

[Patent Document 1] JP H11-045827A
[Patent Document 2] JP H11-045828A
[Patent Document 3] JP 2011-052291A

DISCLOSURE OF THE INVENTION

Problems to be Solved by the Invention

However, when using a porous aluminum electrode as described above, a problem is presented in that when formation is performed in an aqueous solution of ammonium adipate, the ammonium adipate adhering to the porous aluminum electrode will combust and explode when thermal depolarization is performed, and the porous layer will be destroyed.

As the result of thoroughgoing research into the cause of this problem, the inventors made the following new discovery. Because a porous layer formed by sintering powdered aluminum contains intricately intertwined spaces penetrating deep into the layer, correspondingly high capacitance can be obtained, but the aqueous solution of ammonium adipate is easily trapped within the spaces in the porous layer when aluminum ions eluted during formation precipitate as aluminum hydroxide. As a result, the ammonium adipate trapped within the spaces combusts and explodes when the thermal depolarization process is performed, destroying the porous layer.

In view of the problem described above, an object of the present invention is to provide a method for manufacturing an electrode for an aluminum electrolytic capacitor in which destruction of a porous layer during a thermal depolarization process can be prevented even when an aqueous solution of ammonium adipate is used to perform formation upon a porous aluminum electrode.

Means to Solve the Problems

In order to achieve the above object, the present invention is directed to a method for manufacturing an electrode for an aluminum electrolytic capacitor that has a purified water boiling step of boiling an aluminum electrode in purified water, and a forming step of performing formation upon the aluminum electrode after the purified water boiling step until a film withstand voltage of 200 V or higher is reached, the method being characterized in that the aluminum electrode is a porous aluminum electrode constituted by an aluminum core and a porous layer formed by sintering powdered aluminum layered upon a surface thereof, at least a first forming process of performing formation in an aqueous solution of ammonium adipate having a temperature of 80° C. or less and a second forming process of performing formation in an inorganic-acid-based forming solution after the first forming process are performed during the forming step, and, when a thermal depolarization process of heating the aluminum electrode is first performed after performing the first forming process, a water washing process is performed upon the porous aluminum electrode for at least five minutes before the thermal depolarization process.

In the present invention, the formation is performed after boiling the aluminum electrode in purified water, allowing for the formation of a sufficiently thick oxide film using little electricity, which in turn allows an aluminum electrode of high film withstand voltage to be obtained. Because the aluminum electrode is a porous aluminum electrode constituted by an aluminum core and a porous layer formed by sintering powdered aluminum layered upon a surface thereof, there is no need to perform etching using hydrochloric acid or the like, and higher capacitance can be obtained than would be yielded by an etched aluminum electrode. In the forming step, a first forming process is performed in an aqueous solution of ammonium adipate, after which a second forming process is performed in a boric-acid-based, phosphoric-acid-based, or other type of inorganic forming solution, allowing high capacitance to be obtained and leakage current to be reduced. In the first forming process, formation is performed in an aqueous solution of ammonium adipate having a temperature of 80° C. or less, allowing the elution of aluminum ions during formation to be kept to a low level. The occurrence of the aqueous solution of ammonium adipate becoming trapped in the spaces in the porous layer due to the aluminum ions precipitating as aluminum hydroxide is thus inhibited. A water washing treatment is performed upon the aluminum electrode for at least five minutes prior to a thermal depolarization process of heating the aluminum electrode when the thermal depolarization process is performed after the first forming process, allowing the aqueous solution of ammonium adipate to be reliably washed out of the spaces.

It is thus possible to prevent combustion and explosion of the ammonium adipate within the spaces in the porous layer during the thermal depolarization process, thereby preventing the destruction of the porous layer.

The present invention is especially effective when applied to cases in which the porous layer is 150 μm to 3,000 μm thick. A thicker porous layer yields higher capacitance, but tends to cause the aqueous solution of ammonium adipate to become trapped in the spaces in the porous layer; however, in accordance with the present invention, ammonium adipate does not readily remain within the spaces in the porous layer when the thermal depolarization process is performed, even if the porous layer has a thickness of 150 μm or greater. It is thus possible to prevent combustion and explosion of the adipic acid in the spaces, thereby preventing the destruction of the porous layer.

In the present invention, the temperature of the aqueous solution of ammonium adipate during the first forming process is preferably 30-80° C. A temperature of 30° C. or higher for the aqueous solution of ammonium adipate will allow high capacitance to be obtained.

In the present invention, the ammonium adipate concentration of the aqueous solution of ammonium adipate during the first forming process is preferably 0.3-1.3% by weight.

In the present invention, the porous layer is preferably formed by sintering powdered aluminum having an average particle diameter of 1-5 μm.

In the present invention, the thermal depolarization process is preferably performed at a temperature of 450-550° C. If the temperature is less than 450° C., the thermal depolarization effect will be insufficient, making it impossible to sufficiently reduce leakage current; conversely, if the temperature exceeds 550° C., film growth will occur, reducing capacitance.

In the present invention, an intermediate process of immersing the aluminum electrode in an aqueous phosphoric acid solution is preferably performed during the first forming process. This allows for the removal of aluminum hydroxide that might block the spaces in the porous layer during the first forming process, making it possible to prevent the combustion and explosion of the ammonium adipate within the spaces in the porous layer during the thermal depolarization process.

Effect of the Invention

In the present invention, the formation is performed after washing the aluminum electrode in purified water, allowing for the formation of a sufficiently thick oxide film using little electricity. Because the aluminum electrode is a porous aluminum electrode constituted by an aluminum core and a porous layer formed by sintering powdered aluminum layered upon a surface thereof, there is no need to perform etching using hydrochloric acid or the like, and higher capacitance can be obtained than would be yielded by an etched aluminum electrode. In the forming step, a first forming process is performed in an aqueous solution of ammonium adipate, after which a second forming process is performed in a boric-acid-based, phosphoric-acid-based, or other type of inorganic forming solution, allowing high capacitance to be obtained and leakage current to be reduced. In the first forming process, formation is performed in an aqueous solution of ammonium adipate having a temperature of 80° C. or less, allowing the elution of aluminum ions during formation to be kept to a low level. The occurrence of the aqueous solution of ammonium adipate becoming trapped in the spaces in the porous layer due to the aluminum ions precipitating as aluminum hydroxide is thus inhibited. A water washing treatment is performed upon the aluminum electrode for at least five minutes prior to a thermal depolarization process of heating the aluminum electrode when the thermal depolarization process is performed after the first forming process, allowing the aqueous solution of ammonium adipate to be reliably washed out of the spaces. It is thus possible to prevent combustion and explosion of the ammonium adipate within the spaces in the porous layer during the thermal depolarization process, thereby preventing the destruction of the porous layer.

MODE FOR CARRYING OUT THE INVENTION

In the present invention, a porous aluminum electrode constituted by an aluminum core and a porous layer formed by sintering powdered aluminum layered upon a surface thereof is used instead of etched aluminum foil to manufacture an electrode for an aluminum electrolytic capacitor, and formation is performed upon the porous aluminum electrode. The features of the porous aluminum electrode will now be described, followed by a description of the forming method.

(Features of the Porous Aluminum Electrode)

Figure 1A:
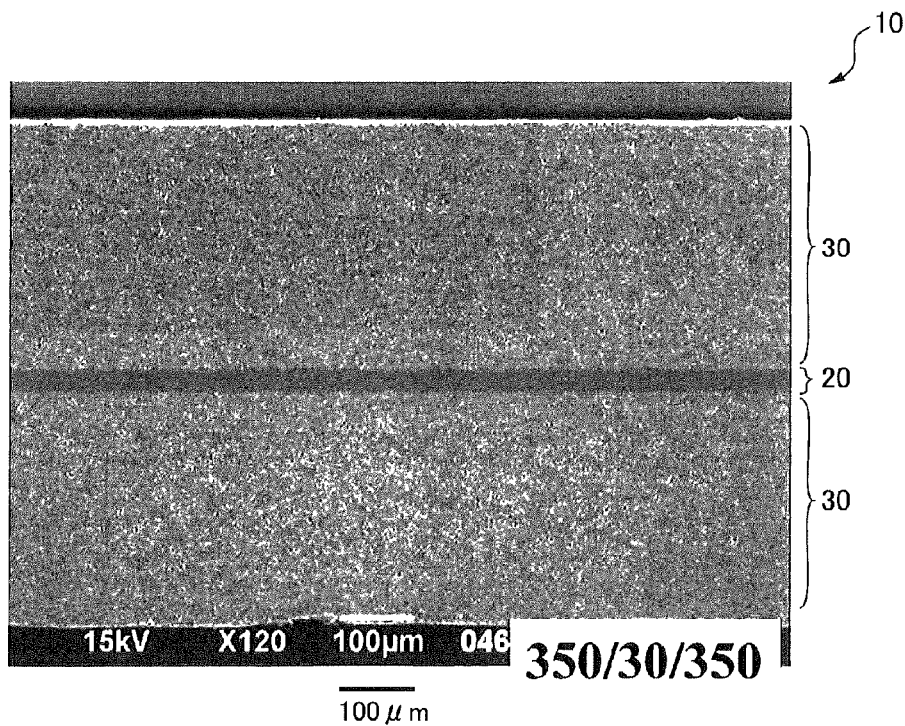
FIG. 1(A) and FIG. 1(B) An illustration showing the cross-sectional structure of a porous aluminum electrode to which the present invention has been applied.
Figure 1B:
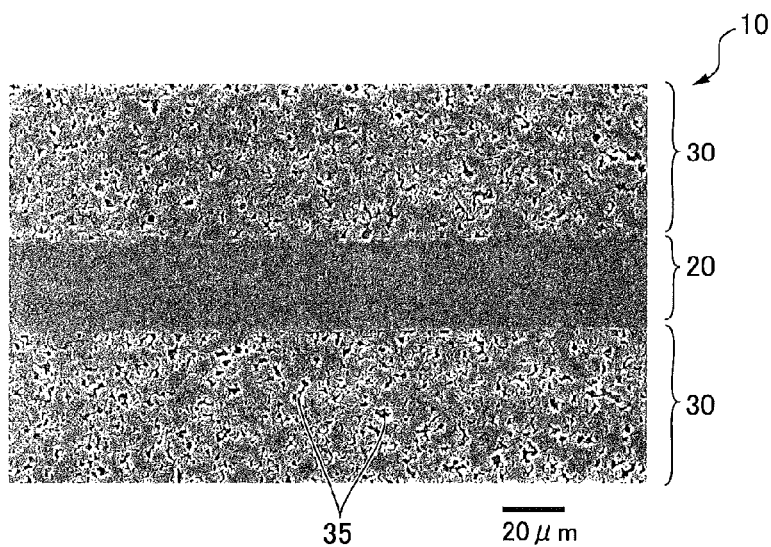
Figure 2A:
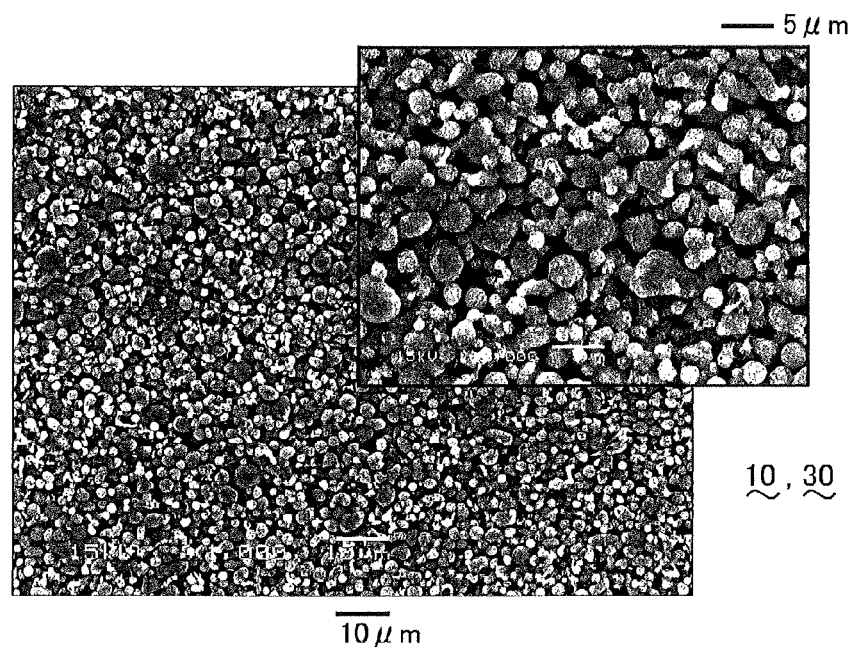
FIG. 2(A) and FIG. 2(B) An illustration showing the detailed structure of a porous aluminum electrode to which the present invention has been applied.

FIG. 1 is an illustration showing the cross-sectional structure of a porous aluminum electrode to which the present invention has been applied, with FIGS. 1(a) and (b) being a 120× magnification electron photomicrograph of the cross section of the porous aluminum electrode and a 600× magnification electron photomicrograph of the vicinity of the core metal of the porous aluminum electrode, respectively. FIG. 2 is an illustration showing the detailed structure of a porous aluminum electrode to which the present invention has been applied, with FIGS. 2(a) and (b) being magnified electron photomicrographs of the surface of the porous aluminum electrode and a 3,000× magnification electron photomicrograph of the cross section of an electrode for an aluminum electrolytic capacitor formed by forming the porous aluminum electrode, respectively. In FIG. 2(a), a 1,000× magnification photograph and a 3,000× magnification photograph of the surface of the porous aluminum electrode are shown.

The porous aluminum electrode 10 shown in FIGS. 1 and 2 comprises an aluminum core 20 and porous layers 30 layered upon the surface of the aluminum core 20, the porous layers 30 being layers of sintered powdered aluminum. In the present embodiment, the porous aluminum electrode 10 comprises a porous layer 30 on both sides of the aluminum core 20.

In the present embodiment, the aluminum core 20 is 10-50 μm thick. FIG. 1 shows a porous aluminum electrode 10 using a roughly 30 μm-thick aluminum core 20. The thickness of the porous layers 30 is, for example, 150-3,000 μm; in FIG. 1, a porous aluminum electrode 10 in which roughly 350 μm-thick porous layers 30 are formed on both sides of a 30 μm-thick aluminum core 20 is shown. The porous layers 30 are preferably thick, as capacitance increases with thickness; however, as the formation will have difficulty penetrating into the deeper parts of spaces 35 in the porous layers 30 if the thickness exceeds 3,000 μm, the porous layers 30 are preferably no more than 3,000 μm thick.

The aluminum core 20 has an iron content of less than 1,000 ppm by weight. The porous layers 30 are formed by sintering powdered aluminum having an iron content of less than 1,000 ppm by weight, the powdered aluminum being sintered so as to maintain spaces 35 therein.

In the present embodiment, there is no particular limitation upon the morphology of the powdered aluminum; any of roughly spherical, amorphous, scaly, short fibrous, or the like can be advantageously used. A powder of roughly spherical particles is especially preferable in order to maintain spaces within the powdered aluminum. The average particle diameter of the powdered aluminum of the present embodiment is 1-10 μm. This allows for an effective increase in surface area. More specifically, if the average particle diameter of the powdered aluminum is less than 1 μm, the gaps in the powdered aluminum will be too narrow, increasing the amount of ineffective sections not exhibiting electrode functionality; conversely, if the average particle diameter of the powdered aluminum exceeds 10 μm, the gaps in the powdered aluminum will be too broad, leading to an insufficient increase in surface area. This is because the spaces 35 in the powdered aluminum will be filled in, reducing capacitance, when forming a formed film having a film withstand voltage of 200 V or higher if the average particle diameter of the powdered aluminum is less than 1 μm. Conversely, the spaces 35 will be too large, impeding large increases in capacitance, if the average particle diameter exceeds 10 μm. Thus, the powdered aluminum used for the porous layers 30 preferably has an average particle diameter of 1-10 μm in order to obtain high capacitance when a thick formed film having a film withstand voltage of 200 V or higher is formed; this allows capacitance comparable to or greater than that of a conventional etched foil to be obtained. High capacitance can be more reliably obtained if the powdered aluminum used for the porous layers 30 has an average particle diameter of 1-5 μm, and even higher capacitance can be obtained if the powdered aluminum has an average particle diameter of 2-5 μm.

In the present embodiment, the aluminum core 20 and the powdered aluminum used for the porous layers 30 have iron contents of less than 1,000 ppm by weight, allowing a good-quality formed film to be formed when formation is performed upon the porous layers 30. This is because the leakage current value will increase due to the presence of a residual coarse Al—Fe intermetallic compound in the formed film if the iron content is 1,000 ppm by weight or higher, but no such increase in leakage current value will occur if the iron content is less than 1,000 ppm by weight.

Figure 2B:
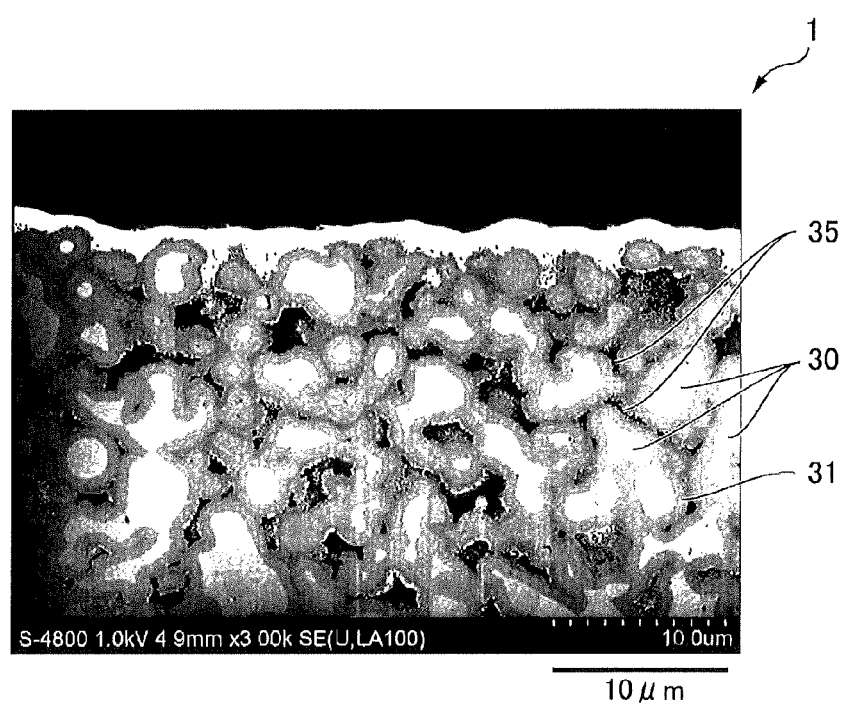

In the present embodiment, when using the porous aluminum electrode 10 as an anode for an aluminum electrolytic capacitor, a formed film 31 is formed on the porous layers 30, as shown by the anode (electrode 1 for an aluminum electrolytic capacitor) in FIG. 2(b). If parts of the aluminum core 20 are exposed by the porous layers 30 at this time, the formed film 31 is also formed on the aluminum core 20. When forming the formed film 31 in the present embodiment, the porous aluminum electrode 10 is formed after being boiled in purified water; thus, part of the film formed on the surface of the porous layer 30 in FIG. 2(b) is the formed film 31.

(Method for Manufacturing Porous Aluminum Electrode 10)

In a method for manufacturing the porous aluminum electrode 10 to which the present invention has been applied, a film formed from a composition containing powdered aluminum having an iron content of less than 1,000 ppm by weight is formed on the surface of a 10-50 μm-thick aluminum core 20 having an iron content of less than 1,000 ppm by weight. The aluminum core 20 and the powdered aluminum may contain one or more elements such as copper (Cu), manganese (Mn), magnesium (Mg), chromium (Cr), zinc (Zn), titanium (Ti), vanadium (V), gallium (Ga), nickel (Ni), boron (B), and zirconium (Zr). In such cases, the content of each of these elements is preferably 100 ppm by weight or less, especially 50 ppm by weight or less. The powdered aluminum is produced, for example, via atomization, melt-spinning, spinning disc, spinning electrode, or another rapid solidification method. Of these various methods, atomization, especially gas atomization, is especially preferable in terms of industrial productivity; in atomization, a powder is obtained by atomizing molten aluminum.

The composition may contain a resin binder, solvent, sintering aid, surfactant, or the like as necessary. Known or commercially available versions of these various additives can be used. In the present embodiment, at least one of a resin binder or a solvent is preferably included so as to create a paste-like composition. This will allow for more efficient film formation. Examples of advantageously usable resin binders include carboxy-modified polyolefin resin, vinyl acetate resin, vinyl chloride resin, vinyl chloride/vinyl acetate copolymer resin, vinyl alcohol resin, butyral resin, vinyl fluoride resin, acrylic resin, polyester resin, urethane resin, epoxy resin, urea resin, phenol resin, acrylonitrile resin, nitrocellulose resin, paraffin wax, polyethylene wax, and other synthetic resins, and wax, tar, glue, lacquer, rosin, beeswax, and other natural resins and waxes. These binders include those that volatilize when heated and those that leave a residue in the powdered aluminum due to pyrolysis depending on the molecular weight, type of resin, etc.; a suitable resin can be used according to requirements such as electrostatic properties. A solvent is added when preparing the composition; examples of solvents that can be used include water, ethanol, toluene, ketones, esters, and the like used singly or in combination.

A known method can be adopted, as appropriate, to form the film according to the properties of the composition and the like. For example, if the composition is a powder (solid), a compressed powder thereof can be formed (or thermo-compressively bonded) onto a substrate. In such cases, the compressed powder can be solidified via sintering, bonding the aluminum powder onto the aluminum core 20. If the composition is a liquid (paste), a film can be formed via application using a roller, a brush, spraying, dipping, or the like, or formed using a known printing method. The film may be dried at a temperature in a range from 20° C. to 300° C. as necessary.

A step of roughening the surface of the aluminum core 20 may be performed prior to forming the film. Examples of roughening methods include known techniques such as washing, etching, and blasting.

Next, in a second step, the film is sintered at a temperature of 560° C. to 660° C. Sintering time will vary according to sintering temperature and the like, but can normally be set in a range of roughly 5-24 hours. There is no particular limitation upon the sintering atmosphere, and any of, for example, a vacuum atmosphere, inert gas atmosphere, oxidizing gas atmosphere (natural atmosphere), reducing atmosphere, or the like is acceptable, with a vacuum atmosphere or reducing atmosphere being especially preferable. Pressure conditions may be ambient pressure, reduced pressure, or increased pressure. If the composition (film) contains an organic component such as a resin binder, a heating process (degreasing process) is preferably performed at a temperature in a range of 100-600° C. for at least five hours after the first step and before the second step. There is no particular limitation upon the atmosphere of the heating process in such cases; for example, any of a vacuum atmosphere, inert gas atmosphere, or oxidizing gas atmosphere is acceptable. Pressure conditions may be ambient pressure, reduced pressure, or increased pressure.

To manufacture an aluminum electrolytic capacitor using the formed porous aluminum electrode 10 (electrode 1 for an aluminum electrolytic capacitor) of the present embodiment, for example, an anode foil constituted by the formed porous aluminum electrode 10 (electrode 1 for an aluminum electrolytic capacitor) and a cathode foil are wrapped with a separator disposed therebetween to form a capacitor element. Next, the capacitor element is impregnated with an electrolytic solution (paste). The electrolytic-solution-impregnated capacitor element is then inserted into a sheathing case, and the case is sealed. If a solid electrolyte is used instead of an electrolytic solution, a solid electrolyte layer is formed on the surface of the anode film constituted by the formed porous aluminum electrode 10 (electrode 1 for an aluminum electrolytic capacitor), after which a cathode layer is formed on the surface of the solid electrolyte layer, followed by the whole being encased in resin or the like. During this process, an anode terminal electrically connected to the anode and a cathode terminal electrically connected to the cathode layer are provided. In this case, multiple anode films may be layered.

The porous aluminum electrode 10 may also have a structure in which a porous layer 30 is layered upon the surface of a rod-shaped aluminum core 20. To manufacture an aluminum electrolytic capacitor using a porous aluminum electrode 10 of this sort, for example, a solid electrolyte layer is formed on the surface of the anode constituted by the formed porous aluminum electrode 10 (electrode 1 for an aluminum electrolytic capacitor), after which a cathode layer is formed on the surface of the solid electrolyte layer, followed by the whole being encased in resin or the like. During this process, an anode terminal electrically connected to the anode and a cathode terminal electrically connected to the cathode layer are provided.

(Forming Method)

Figure 3:
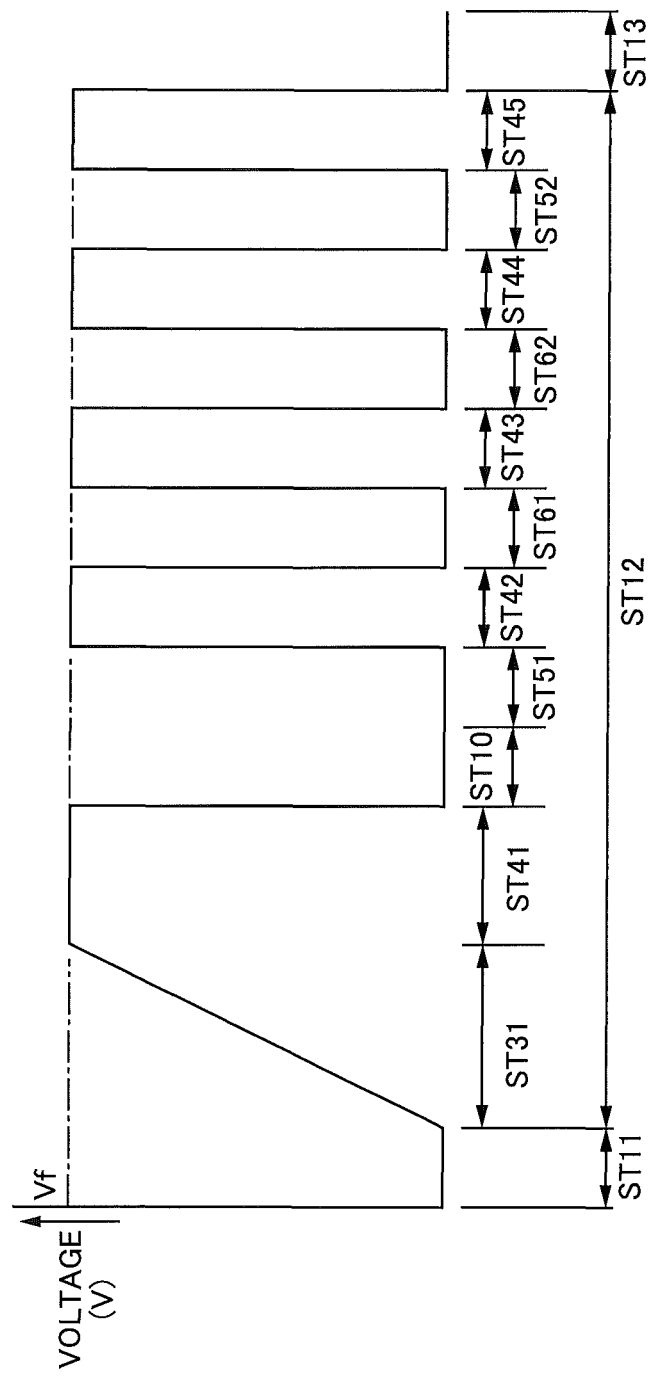
FIG. 3 An illustration showing a method for manufacturing an electrode for an aluminum electrolytic capacitor (forming method) to which the present invention has been applied.

FIG. 3 is an illustration showing a method for manufacturing an electrode 1 for an aluminum electrolytic capacitor (forming method) to which the present invention has been applied.

In the method for manufacturing an electrode 1 for an aluminum electrolytic capacitor according to the present embodiment, as shown in FIG. 3, a purified water boiling step ST11 in which the porous aluminum electrode 10 (aluminum electrode) is boiled in purified water is performed, after which a forming step ST12 in which formation is performed on the porous aluminum electrode 10 until a film withstand voltage of 200 V or higher is reached, following by a drying step ST13. In the forming step ST12, at least a first forming process ST31 of performing formation in an aqueous solution of ammonium adipate having a temperature of 80° C. or less and second forming processes ST41, ST42, ST43, ST44, ST45 of performing formation in a boric-acid-based, phosphoric-acid-based, or other inorganic-acid-based forming solution after the first forming process ST31 are performed. During this process, thermal depolarization processes ST51, ST52 of heating the porous aluminum electrode 10 and liquid depolarization processes ST61, ST62 of immersing the porous aluminum electrode 10 in a phosphate-ion-containing aqueous solution or the like are performed. The depolarization process involves performing a combination of the thermal depolarization processes ST 51, ST52 and the liquid depolarization processes ST61, ST62, but, no matter how the processes are combined, the final depolarization process is preferably a thermal depolarization process.

In the present embodiment, a water washing process ST10 is performed on the porous aluminum electrode 10 for at least five minutes before the thermal depolarization process ST51 first performed out of the thermal depolarization processes ST 51, ST52 is performed.

The forming method described above will be described in detail with reference to FIG. 3. First, in the purified water boiling step ST11, the porous aluminum electrode 10 (aluminum electrode) is boiled for three to ten minutes in purified water to form aluminum hydrates such as boehmite on the porous aluminum electrode 10.

Next is performed the forming step ST12 of forming the porous aluminum electrode 10 until a film withstand voltage of 200 V or higher is reached. In the forming step ST12 of the present embodiment, fixed-current formation is first performed in an aqueous solution of ammonium adipate having a temperature of 80° C. or less until a forming voltage Vf is reached (first forming process ST31). In the first forming process ST31 of the present embodiment, the aqueous solution of ammonium adipate has a temperature of 30-80° C., and the ammonium adipate concentration of the aqueous solution of ammonium adipate is 0.3-1.3% by weight.

After the power source voltage reaches the forming voltage Vf in the fixed-current formation of first forming process ST31, the porous aluminum electrode 10 is washed in water as necessary, after which fixed-voltage formation is performed in a boric-acid-based forming solution in the second forming process ST41. During this process, the power source voltage is kept at the forming voltage Vf. In the second forming process ST41 of the present embodiment, as well as the second forming processes ST42, ST43, ST44, ST45 to be described hereafter, an aqueous solution of 8-10% by weight boric acid and roughly 1% by weight ammonium borate is used as the forming solution, and the temperature of the forming solution is 85-95° C.

After the second forming process ST41 has been performed for a predetermined length of time, the water washing process ST10 is performed on the porous aluminum electrode 10 for at least five minutes. In the present embodiment, immersion washing, rinse washing, shower washing, or a combination thereof can be used as the water washing process ST10. There is no particular limitation on the maximum washing time, but a length of time such that a burnt odor is not produced when the subsequent thermal depolarization process ST51 is performed, such as 10 minutes or less, is sufficient.

Next, the thermal depolarization process ST51 of heating the porous aluminum electrode 10 is performed. The process temperature is 450-550° C., and the process time is 2-10 minutes.

Next, fixed-voltage formation is again performed in a boric-acid-based forming solution (second forming process ST42). During this process, the power source voltage is kept at the forming voltage Vf.

After the second forming process ST42 has been performed for a predetermined length of time, the porous aluminum electrode 10 is washed in water as necessary, after which the porous aluminum electrode 10 is immersed in an aqueous phosphoric acid solution in the liquid depolarization process ST61. In the liquid depolarization process ST61, voltage is not applied to the porous aluminum electrode 10. In the liquid depolarization process ST61 and the liquid depolarization process ST62, to be described hereafter, of the present embodiment, a 20-30% by weight aqueous phosphoric acid solution is used, and the temperature of the solution is 60-70° C. Immersion time is 5-15 minutes according to the film withstand voltage.

After the liquid depolarization process ST61 has been performed for a predetermined length of time, the porous aluminum electrode 10 is washed in water as necessary, after which fixed-voltage formation is again performed in a boric-acid-based forming solution (second forming process ST43). During this process, the power source voltage is kept at the forming voltage Vf.

After the second forming process ST43 has been performed for a predetermined length of time, the porous aluminum electrode 10 is washed in water as necessary, after which the porous aluminum electrode 10 is again immersed in an aqueous phosphoric acid solution (liquid depolarization process ST62). During this process, voltage is not applied to the porous aluminum electrode 10.

After the liquid depolarization process ST62 has been performed for a predetermined length of time, the porous aluminum electrode 10 is washed in water as necessary, after which fixed-voltage formation is again performed in a boric-acid-based forming solution (second forming process ST44). During this process, the power source voltage is kept at the forming voltage Vf.

After the second forming process ST44 has been performed for a predetermined length of time, the porous aluminum electrode 10 is washed in water as necessary, after which a thermal depolarization process ST52 of heating the porous aluminum electrode 10 is again performed. The process temperature is 450-550° C., and the process time is 3-15 minutes.

Next, fixed-voltage formation is again performed in a boric-acid-based forming solution (second forming process ST45). During this process, the power source voltage is kept at the forming voltage Vf.

After the second forming process ST45 has been performed for a predetermined length of time, the porous aluminum electrode 10 is washed in water, after which the drying step ST13 is performed. It is also possible to immerse the porous aluminum electrode 10 in an aqueous phosphoric acid solution, followed by performing the drying step ST13, instead of or after washing the porous aluminum electrode 10 in water. Such a process allows the water resistance of the electrode 1 for an aluminum electrolytic capacitor to be improved.

(Main Effects of the Present Embodiment)

In the present embodiment, as described above, the formation is performed after boiling the porous aluminum electrode 10 in purified water, allowing for the formation of a sufficiently thick oxide film using little electricity, which in turn allows an aluminum electrode of high film withstand voltage to be obtained. Because the aluminum electrode is a porous aluminum electrode 10 constituted by an aluminum core 20 and porous layers 30 formed by sintering powdered aluminum layered upon surfaces thereof, there is no need to perform etching using hydrochloric acid or the like. In addition, the spaces 35 are intricately intertwined deep into the porous aluminum electrode 10, allowing higher capacitance to be obtained than would be yielded by an etched aluminum electrode.

In the forming step ST12, the first forming process ST31 is performed in an aqueous solution of ammonium adipate, imparting the formed film 31 with high crystallinity. This allows high capacitance to be obtained. After the first forming process ST31 is performed in the aqueous solution of ammonium adipate, the second forming processes ST41, ST42, ST43, ST44, ST45 are performed in a boric-acid-based or other inorganic-acid-based forming solution, reducing leakage current and allowing for the prevention of reductions in capacitance caused by blockage. If all the forming steps were performed in an aqueous solution of ammonium adipate, blockage of the spaces 35 would occur, leading to reductions in capacitance and increases in leakage current; in the present embodiment, however, the first forming process ST31 is performed in an aqueous solution of ammonium adipate up until partway through, after which the second forming processes ST41, ST42, ST43, ST44, ST45 are performed in a boric-acid-based aqueous solution. It is thus possible to prevent reductions in capacitance and increases in leakage current caused by blockage of the spaces 35.

In the first forming process ST31, formation is performed in an aqueous solution of ammonium adipate having a temperature of 80° C. or less, allowing the elution of aluminum ions during formation to be kept to a low level. The occurrence of the aqueous solution of ammonium adipate becoming trapped in the spaces 35 in the porous layers 30 due to the aluminum ions precipitating as aluminum hydroxide is thus inhibited. After the first forming process ST31 has been performed, a water washing process is performed upon the porous aluminum electrode 10 for at least five minutes before the thermal depolarization process ST51 in which the porous aluminum electrode 10 is first heated is performed, allowing the aqueous solution of ammonium adipate to be reliably washed out of the spaces 35 in the porous layers 30. It is thus possible to prevent combustion and explosion of the ammonium adipate within the spaces 35 in the porous layers 30 during the thermal depolarization process ST51, thereby preventing the destruction of the porous layers 30.

If the temperature of the aqueous solution of ammonium adipate in the first forming process ST31 is less than 30° C., the crystallinity of the formed film 31 will be reduced; in the present embodiment, however, the temperature of the aqueous solution of ammonium adipate is at least 30° C., imparting the formed film 31 with high crystallinity. This allows high capacitance to be obtained. If the temperature of the aqueous solution of ammonium adipate is 40° C. or higher, the crystallinity of the formed film 31 will be further increased; thus, the temperature of the aqueous solution of ammonium adipate is preferably at least 40° C. and no more than 80° C.

In the first forming process ST31 of the present embodiment, the ammonium adipate concentration of the aqueous solution of ammonium adipate is 0.3-1.3% by weight. If the ammonium adipate concentration of the aqueous solution of ammonium adipate is less than 0.3% by weight, the forming solution will have a high resistivity, impeding the formation of a dense formed film reaching the depths of the spaces 35 and increasing leakage current; in the present embodiment, however, the ammonium adipate concentration is at least 0.3% by weight, leading to low leakage current. If the ammonium adipate concentration of the aqueous solution of ammonium adipate exceeds 1.3% by weight, the electrical discharge voltage will tend to decrease; in the present embodiment, however, the ammonium adipate concentration is 1.3% by weight or less, allowing for compatibility even with a high forming voltage.

In the present embodiment, the present invention is applied to a case in which the porous layer 30 is 150-3,000 µm thick, yielding prominent effects. Specifically, thicker porous layers 30 tend to cause the aqueous solution of ammonium adipate to become trapped in the spaces 35 in the porous layers 30; in the present embodiment, however, the adipate does not readily remain in the spaces 35 in the porous layers 30 during the thermal depolarization process, even if the porous layers 30 have thicknesses of 150 µm or greater. It is therefore possible to prevent combustion and explosion of adipic acid within the spaces 35 even if the porous layers 30 have thicknesses of 150 µm or greater and capacitance is increased three times or more over cases in which an etched foil is used. It is thus possible to prevent the destruction of the porous layers 30.

(Other Embodiments)

In the embodiment described above, the first forming process ST31 is continuously performed; however, if the thickness of the aluminum porous layer 30 is 250 µm or greater, it is preferable to perform an intermediate process of immersing the porous aluminum electrode 10 in an aqueous phosphate ion solution partway through the first forming process ST31, then resume the first forming process ST31. This allows for the removal of aluminum hydroxide that might block the spaces 35 in the porous layers 30 during the first forming process ST31, making it possible to prevent the combustion and explosion of the ammonium adipate within the spaces 35 in the porous layers 30 during the thermal depolarization process ST51. An aqueous phosphoric acid solution having a phosphoric acid concentration of, for example, 10-20% by weight can be used in the intermediate process; the temperature of the solution in such cases is 50-60° C., and the process time is 5-15 minutes, according to the thickness of the aluminum porous layers 30. It is sufficient to perform the intermediate process once if the thickness of the aluminum porous layers 30 is 250 µm or greater, but the process is preferably performed at least twice if the thickness of the aluminum porous layers 30 is 1,000 µm or greater.

EXAMPLES

Examples of the present invention will now be described. The various types of porous aluminum electrodes 10 shown in table 1 and the forming solutions shown in table 2 were prepared, and formation was performed upon the porous aluminum electrode 10 according to the conditions shown in table 3 to prepare electrodes 1 for an aluminum electrolytic capacitor. The porous aluminum electrodes 10 (electrodes 1 for an aluminum electrolytic capacitor) prepared according to the conditions shown in table 3 were measured for film withstand voltage, capacitance (CV accumulation), leakage current, and leakage current/capacitance. Results are shown in table 4. The forming voltage was 300 V, and film withstand voltage and capacitance were measured according to JEITA standards. The average particle diameter of the powdered aluminum was measured using a laser diffraction particle size distribution meter.

TABLE 1

| Type of aluminum electrode | Morphology of porous aluminum electrode 10 | Average particle diameter (µm) of powdered aluminum | Thickness (µm) of porous layers 30 |
|---|---|---|---|
| F1 | Foil (thickness: 30 µm) | 0.5 | 200/side |
| F2 | Foil (thickness: 30 µm) | 3 | 200/side |
| F3 | Foil (thickness: 30 µm) | 3 | 300/side |
| F4 | Foil (thickness: 30 µm) | 5 | 200/side |
| F5 | Foil (thickness: 30 µm) | 10 | 200/side |
| F6 | Rod-shaped (diameter: 1 mm) | 5 | 1000 |

TABLE 2

| Forming solution type | Forming solution composition |
|---|---|
| A | A1) 1% by weight ammonium adipate |
|   | A2) 9% by weight boric acid + 1% by weight ammonium borate |
| B | B1) 0.25% by weight ammonium adipate |
|   | B2) 9% by weight boric acid + 1% by weight ammonium borate |

TABLE 3

| Aluminium electrode type | Forming solution type | Forming solution temperature (° C.) First forming process/ Second forming process | No. of intermediate processes | Water washing process (min) | Total second forming process time (min) | Thermal depolarization (no. of times) | Liquid depolarization (no of times) | Remarks |
|---|---|---|---|---|---|---|---|---|
| F2 | A | 70/90 | 0 | 5 | 60 | 3 | 3 | Example 1 |
| F2 | A | 70/90 | 0 | 5 | 60 | 2 | 3 | Example 2 |
| F2 | A | 70/90 | 0 | 5 | 60 | 3 | 2 | Example 3 |
| F3 | A | 70/90 | 1 | 10 | 90 | 4 | 4 | Example 4 |
| F4 | A | 70/90 | 0 | 5 | 60 | 3 | 3 | Example 5 |
| F2 | A | 70/90 | 0 | 5 | 150 | 3 | 3 | Example 6 |
| F2 | A | 70/90 | 0 | 5 | 60 | 5 | 5 | Example 7 |
| F1 | A | 70/90 | 0 | 5 | 60 | 3 | 3 | Example 8 |
| F5 | A | 70/90 | 0 | 5 | 60 | 3 | 3 | Example 9 |
| F2 | A | 25/90 | 0 | 5 | 60 | 3 | 3 | Example 10 |
| F2 | A | 70/90 | 0 | 5 | 30 | 3 | 3 | Example 11 |

TABLE 3-continued

| Aluminium electrode type | Forming solution type | Forming solution temperature (° C.) First forming process/ Second forming process | No. of intermediate processes | Water washing process (min) | Total second forming process time (min) | Thermal depolarization (no. of times) | Liquid depolarization (no of times) | Remarks |
|---|---|---|---|---|---|---|---|---|
| F2 | A | 70/90 | 0 | 5 | 60 | 1 | 1 | Example 12 |
| F2 | B | 70/90 | 0 | 5 | 60 | 3 | 3 | Example 13 |
| F6 | A | 50/90 | 2 | 20 | 90 | 4 | 4 | Example 14 |
| F2 | A | 70/90 | 0 | 2 | 60 | 3 | 3 | Comparative Example 1 |
| F2 | B | 90/90 | 0 | 5 | 30 | 2 | 2 | Comparative Example 2 |

TABLE 4

| Remarks | Film withstand voltage (V) | Capacitance μF/cm² (CV accumulation) | Leakage current μA/cm² | Leakage current/ capacitance μA/μF |
|---|---|---|---|---|
| Example 1 | 328 | 6.65 (2161) | 355 | 53.4 |
| Example 2 | 327 | 6.69 (2188) | 390 | 58.2 |
| Example 3 | 328 | 6.68 (2191) | 375 | 56.1 |
| Example 4 | 326 | 9.75 (3179) | 480 | 49.2 |
| Example 5 | 330 | 6.46 (2132) | 340 | 52.6 |
| Example 6 | 332 | 6.22 (2065) | 305 | 49.0 |
| Example 7 | 329 | 6.27 (2063) | 330 | 52.6 |
| Example 8 | 331 | 3.92 (1298) | 280 | 71.4 |
| Example 9 | 333 | 3.58 (1192) | 235 | 65.6 |
| Example 10 | 311 | 4.81 (1496) | 420 | 87.3 |
| Example 11 | 315 | 7.00 (2205) | 545 | 77.9 |
| Example 12 | 303 | 7.33 (2221) | 600 | 81.9 |
| Example 13 | 313 | 6.69 (2094) | 515 | 77.0 |
| Example 14 | 316 | 14.3 (4519) | 885 | 61.9 |
| Comparative Example 1 | Damaged | Not measurable | Not measurable | — |
| Comparative Example 2 | Damaged | Not measurable | Not measurable | — |

As is apparent from table 4, in comparative example 1, in which the water washing process ST10 was performed for less than five minutes (specifically, two minutes) before the thermal depolarization process ST51, adipic acid in the spaces 35 within the porous layers 30 combusted and exploded in the thermal depolarization process ST51 even when other conditions were normal, destroying the porous layers 30.

In comparative example 2, in which the temperature of the aqueous solution of ammonium adipate (forming solution) used in the first forming process ST31 exceeded 80° C. (specifically, 90° C.), adipic acid in the spaces 35 within the porous layers 30 combusted and exploded in the thermal depolarization process ST51 even when other conditions were normal, destroying the porous layers 30.

By contrast, in examples 1-14, in which the water washing process ST10 lasted at least five minutes and the temperature of the aqueous solution of ammonium adipate (forming solution) used in the first forming process ST31 was 80° C. or less, the problem of adipic acid combusting and exploding in the spaces 35 in the porous layers 30 did not occur during the thermal depolarization process ST51.

Among examples 1-14, examples 1-7 and 10-13, in which the average particle diameter of the powdered aluminum used to form the porous layers 30 was 2-5 μm, had higher capacitance than examples 8 and 9, in which the average particle diameter was outside the range of 2-5 μm.

Among examples 1-14, example 10, in which the temperature of the aqueous solution of ammonium adipate (forming solution) used to form the porous layers 30 was less than 30° C. (specifically, 25° C.), had lower capacitance than examples 1-3.

Among examples 1-14, example 13, in which the ammonium adipate concentration of the aqueous solution of ammonium adipate (forming solution) used to form the porous layers 30 was less than 0.3% by weight (specifically, 0.25% by weight), had higher leakage current than examples 1-3.

Among examples 1-14, example 6, in which the total process time of the second forming processes ST41, ST42, ST43, ST44, ST45 exceeded 40-120 minutes (specifically, 150 minutes), had lower capacitance than examples 1-3, and example 11, in which the total process time was less than 40-120 minutes (specifically, 30 minutes), had higher leakage current than 1-5. Thus, the process time for the second forming processes ST41, ST42, ST43, ST44, ST45 is preferably 40-120 minutes, more preferably 40-90 minutes. This is thought to be because a dense formed film 31 cannot be sufficiently formed if the forming time is too short, and film growth is excessive if the forming time is too long.

Among examples 1-14, example 7, in which liquid depolarization was performed more than 2-4 times (specifically, five times) had lower capacitance than examples 1-3, and example 12, in which liquid depolarization was performed fewer than 2-4 times (specifically, one time), had higher leakage current than examples 1-3. Thus, liquid depolarization is preferably performed 2-4 times. This is believed to be because defects are not sufficiently repaired if liquid depolarization is not performed enough times, and excessive formed film growth and dissolution occurs if liquid depolarization is performed too many times. In example 12, the thermal depolarization process ST51 was performed at the timing of the thermal depolarization process ST52, and the water washing process ST10 was performed immediately prior thereto, and thermal depolarization was performed once, thus leading to higher leakage current than in examples 1-3. Thus, thermal depolarization is preferably performed 2-4 times. If thermal depolarization is not performed enough times, defects are not sufficiently repaired, and if thermal depolarization is performed too many times, productivity is reduced.

In examples 4 and 14, the porous layers 30 had high thicknesses of 300 μm and 1,000 μm, but an intermediate process was performed using an aqueous phosphoric acid solution, with the result that there was no blockage of the spaces 35 in the porous layers 30, as in the cases of examples 1-30, in which the porous layers 30 were 200 μm thick.

REFERENCE NUMBERS

10 Porous aluminum electrode
20 Aluminum core

30 Porous layer
31 Formed film
35 Spaces

The invention claimed is:

1. A method for manufacturing an electrode for an aluminum electrolytic capacitor, the method comprising: (i) a purified water boiling step of boiling an aluminum electrode in purified water, and (ii) a forming step of performing formation upon the aluminum electrode after the purified water boiling step until a film withstand voltage of 200 V or higher is reached,
  wherein the aluminum electrode is a porous aluminum electrode constituted by an aluminum core and a porous layer formed by sintering powdered aluminum layered upon a surface of the aluminum core;
  wherein the forming step (ii) comprises at least (a) a first forming process of performing formation in an aqueous solution of ammonium adipate having a temperature of 80° C. or less and (b) a second forming process of performing formation in an inorganic-acid-based forming solution after the first forming process is performed;
  wherein the first forming process (a) increases a power source voltage to firstly reach a final forming voltage in the forming step;
  wherein the first forming process (a) further performs an intermediate process of immersing the aluminum electrode in an aqueous phosphoric acid solution before the power source voltage firstly reaches the final forming voltage;
  wherein the second forming process (b) is performed after the power source voltage firstly reaches the final forming voltage; and
  wherein when a thermal depolarization process of heating the aluminum electrode is first performed after performing the first forming process, a water washing process is performed upon the porous aluminum electrode for at least five minutes before the thermal depolarization process.

2. The method for manufacturing an electrode for an aluminum electrolytic capacitor according to claim 1, wherein the porous layer is 150 μm to 3,000 μm thick.

3. The method for manufacturing an electrode for an aluminum electrolytic capacitor according to claim 1, wherein a temperature of the aqueous solution of ammonium adipate during the first forming process is 30° C. to 80° C.

4. The method for manufacturing an electrode for an aluminum electrolytic capacitor according to claim 3, wherein an ammonium adipate concentration of the aqueous solution of ammonium adipate during the first forming process is 0.3% by weight to 1.3% by weight.

5. The method for manufacturing an electrode for an aluminum electrolytic capacitor according to claim 4, wherein the thermal depolarization process is performed at a temperature of 450° C. to 550° C.

6. The method for manufacturing an electrode for an aluminum electrolytic capacitor according to claim 1, wherein an ammonium adipate concentration of the aqueous solution of ammonium adipate during the first forming process is 0.3% by weight to 1.3% by weight.

7. The method for manufacturing an electrode for an aluminum electrolytic capacitor according to claim 6, wherein the thermal depolarization process is performed at a temperature of 450° C. to 550° C.

8. The method for manufacturing an electrode for an aluminum electrolytic capacitor according to claim 1, wherein the porous layer is formed by sintering powdered aluminum having an average particle diameter of 1 μm to 5 μm.

9. The method for manufacturing an electrode for an aluminum electrolytic capacitor according to claim 1, wherein a temperature of the aqueous solution of ammonium adipate during the first forming process is 70° C. or less.

10. The method for manufacturing an electrode for an aluminum electrolytic capacitor according to claim 1, wherein the porous layer is 300 μm to 3,000 μm thick.

11. The method for manufacturing an electrode for an aluminum electrolytic capacitor according to claim 1, wherein the second forming process (b) is performed at the final forming voltage.

* * * * *